June 23, 1959 A. D. SCARBROUGH 2,892,103

GATING CIRCUITS FOR ELECTRONIC COMPUTERS

Filed Nov. 1, 1956 3 Sheets-Sheet 1

ALFRED DALE SCARBROUGH,
INVENTOR.

BY ELWOOD S. KENDRICK

Lester S. Hecht

ATTORNEYS

ALFRED DALE SCARBROUGH,
INVENTOR.

BY ELWOOD S. KENDRICK
Lester S. Hecht
ATTORNEYS

ALFRED DALE SCARBROUGH,
INVENTOR.
BY ELWOOD S. KENDRICK
ATTORNEYS 2,892,103

GATING CIRCUITS FOR ELECTRONIC COMPUTERS

Alfred Dale Scarbrough, Los Angeles, Calif., assignor, by mesne assignments, to Thompson Ramo Wooldridge, Inc., Cleveland, Ohio, a corporation of Ohio Application November 1, 1956, Serial No. 619,699

7 Claims. (Cl. 307—88.5)

This invention relates to improvements in gating circuits for electronic computers, and, more particularly, to gating circuits which may be employed to translate steady-state output signals of a bistable circuit or other two-state device into pulses representing the state thereof.

In digital computer applications it is frequently necessary to employ two-state circuits for generating electrical signals representing either binary 1 or 0. For example, flip-flops or other bistable circuits, and reading amplifiers, are two-state circuits which may be used for this purpose. The typical digital computation circuit also includes electrical gating networks controlled by a plurality of the two-state circuits. Each such gating network then produces an output signal which is a logical function of the input signals which it receives.

It is well known to use gating networks which respond to steady-state input signals for producing a steady-state output signal, and it is also well known to use gating circuits which are responsive to pulse-type input signals for producing a pulse-type output signal. Various types of two-state circuits are known, some of which produce steady-state signals and others of which produce pulse-type signals. In conventional practice, therefore, either a gating network responsive to pulse-type input signals is driven by two-state circuits which generate such pulse-type signals, or a gating network responsive to steady-state input signals is driven by two-state circuits which generate the steady-state signals.

The use of steady-state signals is subject to the disadvantage that excessive power is required in order to apply continuous signals to the gating networks, and to the additional disadvantage that there is an inherent limitation on the operating speed of the system. Furthermore, the purpose of the gating network in most instances is to control the input of a flip-flop, hence if the gating network receives a number of steady-state input signals and produces in response to them a steady-state output signal, there still remains the necessity of converting the steady-state output signal to a pulse-type signal which is suitable for triggering the flip-flop.

This type of output signal reconversion ordinarily requires the use of a coupling capacitor as illustrated, for example, in U.S. Patent No. 2,644,887 to Wolfe. With a conventional diode gating circuit controlled through steady-state input signals the net result, therefore, is that the gating resistors must be small enough in view of the value of the coupling capacitor to insure the proper time constant for the clock pulse rate, but as these resistors are decreased in size the input power requirements go up.

On the other hand, the use of pulse-type signals ordinarily requires pulse shaping and synchronization on an extensive scale, the problem becoming particularly difficult in systems of large size.

An object of the present invention, therefore, is to obviate the power requirements and frequency limitations inherent in computation circuits wherein steady-state electrical signals produced by two-state circuits are applied directly to gating networks.

Another object of the present invention is to avoid the problems of pulse shaping and synchronization which arise where two-state circuits generating pulse type signals are utilized to control gating networks responsive to such signals.

A further object of the present invention is to provide a novel means of coupling two-state circuits to a gating network which is to be controlled by the two-state circuits.

A still further object of the invention is to provide a signal translating circuit for translating steady-state electrical signals into pulse-type electrical signals, whereby two-state circuits producing steady-state output signals may be used to drive gating networks responsive to pulse-type input signals.

Yet a further object of the invention is to provide a novel transistor bistable circuit for producing pulse-type output signals which are synchronized in a predetermined manner.

A specific object of the invention is to provide an improved gating network wherein the static signals of a two-state device may be employed to control the generation of dynamic pulses without affecting the states thereof, allowing transformer coupling throughout the system.

Another specific object is to provide a technique of transformer pulse gating whereby the static state of a controlling bistable element may be sampled without changing the state thereof to derive therefrom relatively high power complementary output pulses.

Still another specific object of the invention is to provide a gating circuit which may be driven from the cathode or emitter electrodes of a flip-flop, thus providing a desirable means of isolation between the load and the flip-flop stability circuits.

In accordance with one of the basic concepts of the invention, at least one of the steady-state, bilevel control signals of a two-state device is applied to a translation means which also receives a timing pulse. The translation means is operable to pass an applied timing pulse to an output circuit or load, the pulse being passed with a polarity determined by the level of the applied control signal.

In the preferred embodiment of the invention, the translation means is a transformer having primary and secondary sections. According to this technique, the bilevel control signal of the two-state device is utilized to control a gating device connected in current series with the primary section of the transformer. Timing pulses are then applied across the primary section of the transformer to pass current through the gating device when it is closed in response to one of the levels of the control signal. In this embodiment, no pulse passes through the primary section of the transformer when the two-state device is in its other state and the associated gating device is open.

The employment of a transformer in this manner makes it possible to match the relatively low impedance of a plurality of parallel connected gating circuits to the higher impedance of the output circuit of the two-state device. Thus, the same power capacity is present without the disadvantage of the known systems in the requirement of pulse shaping and synchronization.

An advantage of the embodiment of the invention in employing a transformer as the signal translation circuit is that each two-state device may supply a large number of gating circuits with input signals without being operated at points of marginal reliability. Another advantage is that the secondary winding of the transformer may be provided with a center tap, thus producing a complementary pair of pulse-type output signals representing the state of the two-state device.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 6:
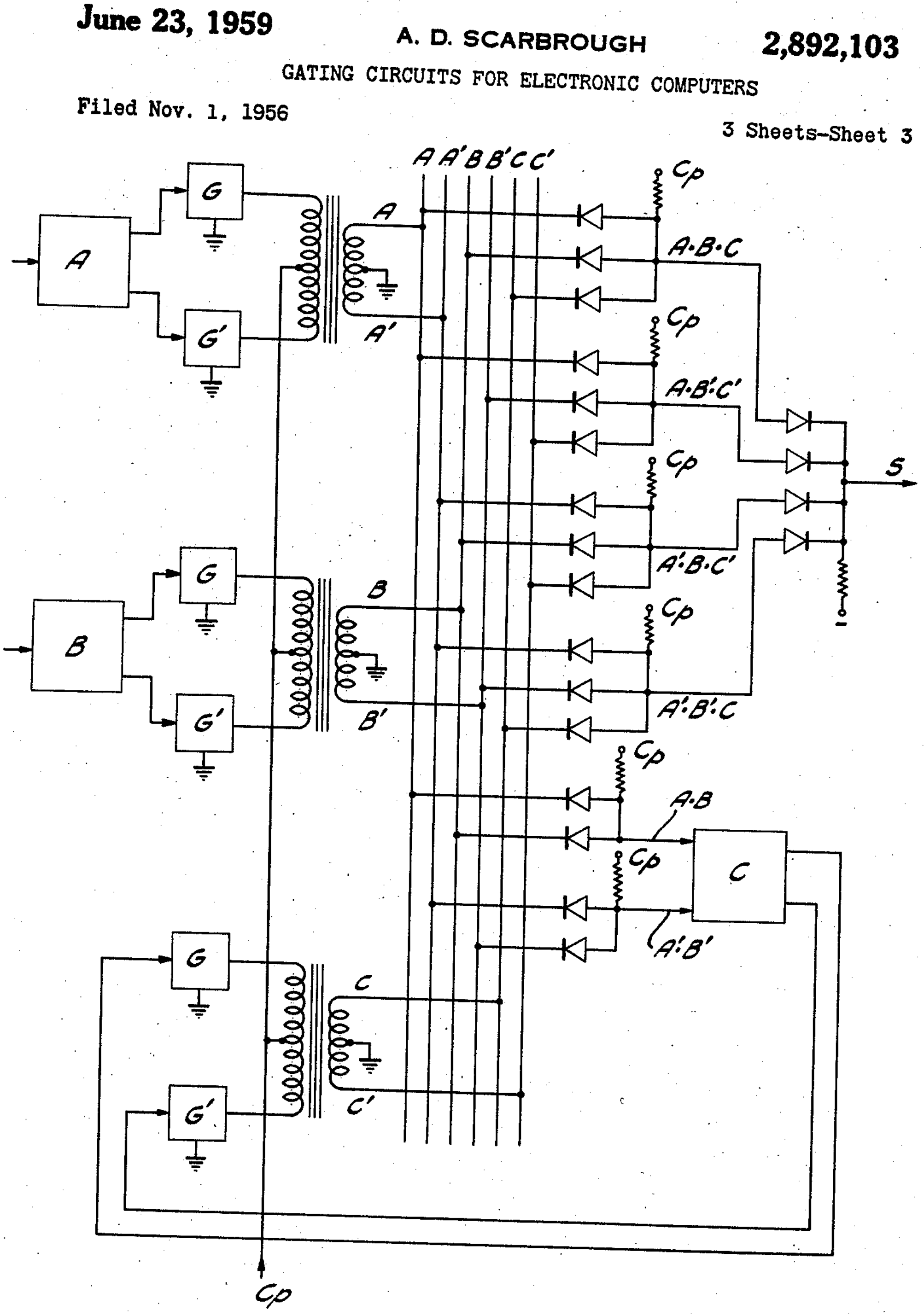

Figures *5a*, *5b*, and *5c* illustrate in schematic form three additional variations in the circuit of the invention utilizing transistor bistable devices; and Figure 6 shows a specific network employing the transformer embodiment of the invention and illustrates a gating technique which may be employed to increase the frequency response of the network.

Figure 1:
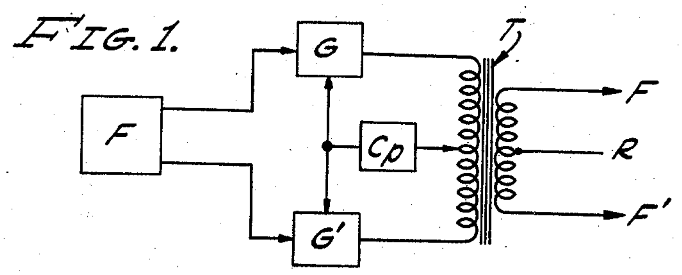
Figure 1 illustrates in block and partial schematic form the basic circuit of the invention.

Refering now to Figure 1 of the drawing, it will be noted that in its general form the invention comprises a two-state circuit F, a pair of gating devices G and G′, and a clock pulse generator C*p*, all illustrated in block form; and a transformer T including primary and secondary windings each having a center tap thereon, illustrated in schematic form.

The two-state circuit F provides a complementary pair of bivalued steady-state control signals which are utilized for controlling gating devices G and G′, respectively. Clock pulse generator C*p* is coupled to the center tap of the primary winding of transformer T for applying a series of unidirectional timing pulses thereto, a return path for the timing pulses being provided through the upper portion of the primary winding and the gating circuit G, when gating circuit G is closed, and through the lower portion of the primary winding and gating circuit G′ when the latter is closed.

More specifically, if the two-state circuit F is in the "on" or 1-representing state, gating circuit G provides a low impedance return path from the upper end of the primary winding to the clock pulse generator, and if circuit F is in the "off" or 0-representing state, gating circuit G′ provides a low impedance current conduction path between the lower end of the primary winding and the clock pulse generator. Thus, each timing pulse produced by the clock pulse generator flows either in one direction or the other through the primary winding of transformer T, depending upon which of the gating devices G and G′ is closed, the latter in turn being controlled by the state of the two-state circuit F.

In response to each timing pulse there is produced in the secondary winding of transformer T an output pulse the polarity of which represents the then existing state of circuit F. In Figure 1 the secondary winding is illustrated as having an output lead F coupled to its upper end, an output lead F′ coupled to its lower end, and a return lead R coupled to its center tap. Therefore, the output pulse appearing between return lead R and one of the output leads directly represents the existing state of circuit F, and the output pulse appearing between return lead R and the other output lead represents the binary complement of the state of circuit F. For example, if circuit F is in the "on" or 1-representing state, the output pulse on output lead F may be a positive pulse while the output pulse on output lead F′ may be negative; and when circuit F is in the "off" or 0-representing state, the positive pulse appears on lead F′ and the negative pulse on lead F.

Figure 2:
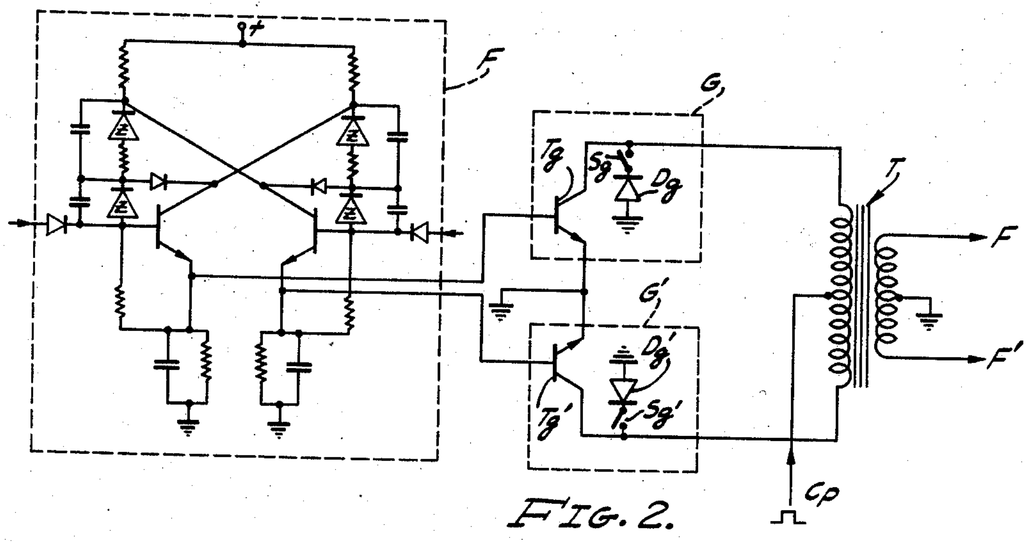
Figure 2 illustrates in schematic form a preferred embodiment of the circuit of Figure 1 wherein NPN transistors are employed as switching elements.

A particular arrangement utilizing the invention is illustrated in Figure 2 wherein a two-state device enclosed in a dotted box F provides output signals for controlling a pair of gating transistors T*g* and T*g*′ respectively enclosed in dotted boxes G and G′. The two-state device F is shown in specific detail in order to illustrate a particular manner of deriving output signals therefrom. However, it will be understood that the particular device employed forms no part of the present invention and therefore specific description of this circuit is not deemed to be necessary herein. Reference for a description of a preferred type of transistor flip-flop, such as is shown in box F, is made to copending application by A. Dale Scarbrough, entitled "Anti-Saturation Circuits for Transistor Amplifiers," Serial No. 642,070, filed February 25, 1957, and assigned to the same assignee as the present application.

An important feature illustrated by the flip-flop circuit shown in Figure 2 is that the output signals may advantageously be derived from the emitters of the respective transistors. These output points provide a low output impedance thus introducing a minimum of load into the flip-flop circuit and reducing the possibility of interfering with the stability cross-coupling of the flip-flop. Where vacuum tubes are utilized to provide the stability circuit of the flip-flop, a similar advantage may be obtained by deriving output signals from the cathodes of the respective vacuum tubes. It will, of course, be understood that output signals may, if desired, be taken from other points in the flip-flop circuit.

In the circuit of Figure 2, the flip-flop output signals are respectively applied to the base electrodes of transistors T*g* and T*g*′, which are preferably of the silicon type. The emitters of both transistors are grounded while the collector electrode of transistor T*g* is connected to the upper end of the primary winding of transformer T, and the collector electrode of transistor T*g*′ is connected to the lower end of the primary winding. When the flip-flop circuit is "on," a conduction path is provided between the center tap of the primary winding and ground, via the upper portion of the winding; and when the flip-flop is "off" the conduction path is instead provided through the lower portion of the winding. In Figure 2 the clock pulse is illustrated as being applied at the center tap of the primary winding in a positive polarity with respect to ground.

It will be noted that a shunt diode D*g* is included in box G of Figure 2 and has its cathode connected to a switch S*g* which is shown to indicate that the inclusion of diode D*g* is optional. The purpose of this diode is to shunt out any negative signals which may occur across the primary of transformer T to prevent them from passing to the emitter electrodes of flip-flop F. A similar arrangement is shown in gating circuit G′ illustrated by diode D*g*′ and switch S*g*′.

While the shunt diode arrangement shown in Figure 2 may be suitable in many cases, it has the tendency to inhibit the pulse response of the circuit so that in other cases it may be preferable to introduce diodes D*g* and D*g*′ in series between the ends of the primary of transformer T and the collector electrodes of transistors T*g* and T*g*′. In this case the anode of the series diode is coupled to the primary of transformer T and the cathode thereof is connected to the collector electrode of the corresponding transistor.

The relative polarities of the transformer windings in Figure 2 are selected so that the application of the clock pulse produces a positive pulse on output lead F and a negative pulse on output lead F′ if the flip-flop circuit is then "on" representing binary 1; or output pulses having the opposite polarities if the flip-flop circuit is then "off" representing binary 0.

In the operation of the circuit of Figure 2 it will be noted that the entire amplitude of the clock pulse is impressed across whichever half of the primary winding is then conductive, hence by virtue of autotransformer action a voltage of the same polarity and amplitude is induced in the other half of the primary winding. This results in the application to the collector of the non-conductive transistor of a voltage pulse whose amplitude is twice that of the clock pulse. Therefore, in order to preclude an undesired breakdown of the transistor which is supposed to be maintained in a non-conductive state, the clock pulse amplitude must be less than one-half the safe inverse voltage of either of the gating transistors Tg and Tg′, measured between collector and emitter.

Figure 3:
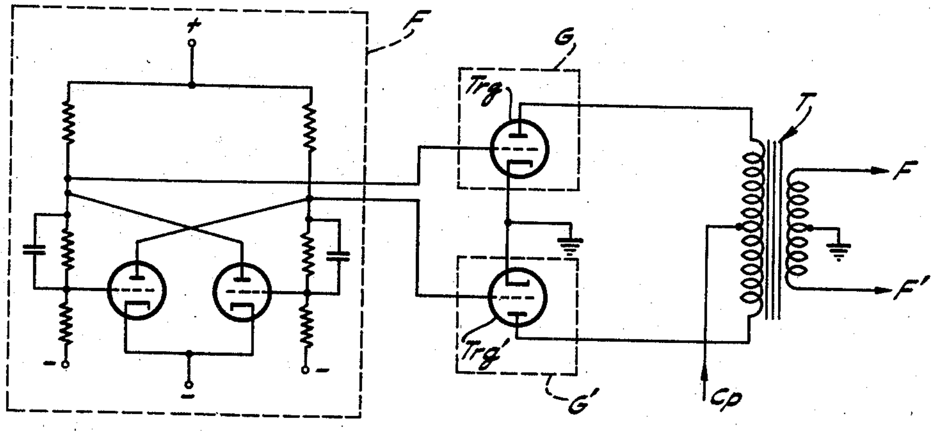
Figure 3 illustrates in schematic form another embodiment of the circuit of Figure 1 wherein vacuum tubes are employed.

A similar arrangement of the invention is shown in Figure 3 where vacuum tubes are employed. The flip-flop shown in Figure 3 is quite conventional and will not be described. It should be noted, however, that the output signals in this case are derived from a relatively high impedance point, namely, the anodes of the triodes in flip-flop F. These signals, then, are applied to the grids of triodes Trg and Trg′ in gating circuits G and G′, and the anodes of these tubes are coupled to opposite ends of the primary of transformer T. The cathode electrodes of these triodes are coupled together and to a suitable source of reference potential, such as ground. This circuit operates in a similar manner to that described above in that the "on" condition of flip-flop F causes triode Trg to provide a low impedance current conduction path for the upper section of the primary of transformer T and the "0" or "off" condition of flip-flop F provides a low impedance current conduction path through the lower section of the primary of transformer T.

Figure 4:
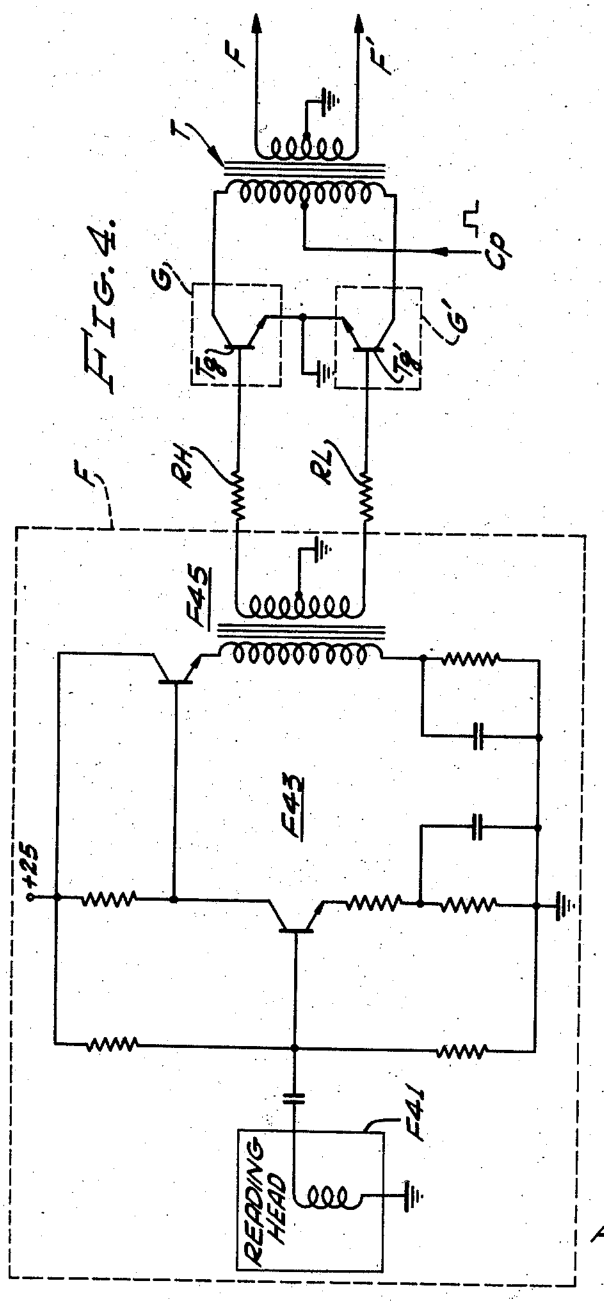
Figure 4 illustrates in schematic form an alternate version of the circuit of Figure 2 wherein the two-state device providing control signals is a reading amplifier for magnetic recording.

Reference is now made to Figure 4 illustrating a manner in which a signal produced by a magnetic reading head may be translated into a series of complementary pairs of pulse type signals. In Figure 4 there is enclosed within the dotted box F a magnetic reading head F41, and a reading amplifier circuit F43 which receives the signal produced by head F41 and converts it into a complementary pair of steady-state output signals appearing at opposite ends of the secondary winding of an output transformer F45. The structure and operation of magnetic head F41 and of the reading amplifier F43 will not be described in detail here since apparatus of this type is widely used and well known to the art. The steady-state output signals produced by the reading amplifier are supplied through series resistors RH and RL to the base electrodes of transistors Tg and Tg′, respectively. It will be noted that the optional diodes Dg and Dg′ illustrated in Figure 2 are not required in connection with the reading amplifier of Figure 4. The structure and operation of the circuit of Figure 4 are in all other respects the same as for the circuit of Figure 2, and hence will not be described again.

Figure 5C:
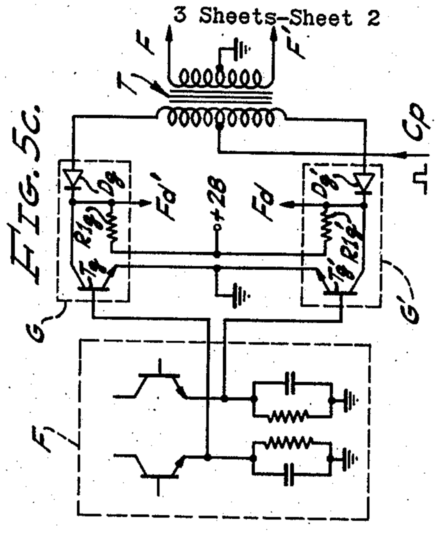
Figure 5B:
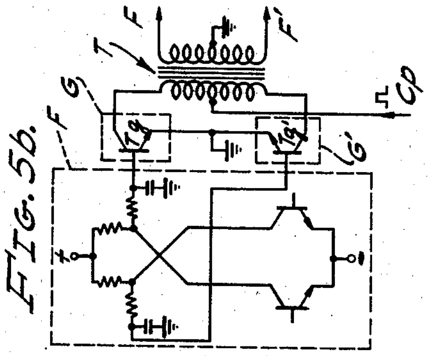
Figure 5A:
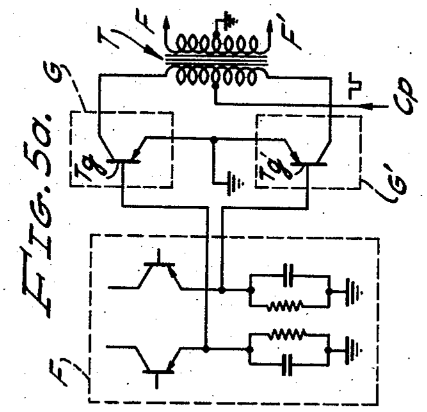

Reference is now made to Figures 5a, 5b, and 5c where three variations in the employment of the invention are illustrated. In Figure 5a, the output transistors of a PNP transistor flip-flop are shown. In this case, then, the gating transistors Tg and Tg′ are also PNP transistors and, as above, receive the controlling output signals from flip-flop F at their base electrodes. The only change required in the operation of the circuit is that the synchronizing pulse Cp is a negative signal and current is drawn in the opposite direction through the transistors. In all other respects, the principle is the same as discussed above.

Another variation of interest is shown in Figure 5b where the control signals are derived from the collector electrodes of flip-flop F. A flip-flop of this type is also described in the above mentioned copending application by A. D. Scarbrough, Serial No. 642,070. The operation of this circuit is quite similar to that described in Figure 2 and, therefore, a further description is not considered necessary.

Figure 5c illustrates an arrangement wherein the same circuit may be utilized to provide complementary pairs of pulse type output signals in the manner described above, and at the same time to provide a complementary pair of steady-state output signals similar to the control signals generated by the two-state circuit. In Figure 5c the transistor flip-flop circuit which is enclosed within dotted box F and illustrated only in part may be identical to the complete flip-flop circuit illustrated in Figure 2. The basic structure of gating circuits G and G′ and of transformer T is also the same as that shown in Figure 2. Diodes Dg and Dg′ are connected in series between the primary winding of transformer T and the collectors of transistors Tg and Tg′, respectively, thus illustrating the alternative arrangement of these diodes which was previously explained in connection with Figure 2. In addition to the circuit structure of Figure 2, however, the circuit of Figure 5c includes a pair of gating resistors R1g and R1g′ respectively connected between a bias source, illustrated as +28 volts, and the collectors of transistors Tg and Tg′, respectively. In keeping with the bias potential of +28 volts it is assumed that the clock pulse rises from ground to approximately 12 volts.

Insofar as the pulse type output signals are concerned, the operation of the circuit of Figure 5c is essentially the same as that of Figure 2. Assume, for example, that transistor Tg is forward-biased so that clock pulse power is drawn through the upper section of the primary winding of transformer T, through diode Dg, and hence through transistor Tg to ground. In this case the potential of output lead Fd′ connected to the collector electrode of transistor Tg is substantially at ground. Although current is supplied from the +28 volt bias source through resistor R1g, it is assumed that the value of resistor R1g is very large in comparison to the impedance of transistor Tg in its conductive state. Thus, there are simultaneously produced a positive pulse, on output lead F, and a steady-state signal having a relatively low voltage level, on output lead Fd′. At the same time, a negative pulse is produced on output lead F′ and a steady-state signal having a relatively high voltage level appears on output lead Fd, which is coupled to the collector electrode of transistor Tg′. It will be noted that diode Dg′ is then back-biased since its cathode potential is substantially at the +28 volt level while its anode receives twice the clock pulse amplitude, or a potential of +24 volts. It will also be noted that the safe inverse voltage of both of the transistors Tg and Tg′ must be at least 28 volts, rather than merely double the clock pulse amplitude.

It readily follows that when transistor Tg is back-biased and transistor Tg′ is forward-biased so that clock pulse power is drawn through the lower section of the primary winding of transformer T, both the pulse type output signals and the steady-state output signals assume their opposite values. It will be noted that diodes Dg and Dg′ not only serve to prevent the undesired feedback of voltage signals into the flip-flop, but fulfill the additional purpose of isolating the pulse output circuit from the steady-state output circuit.

In the description thus far, it has been assumed that the actuating power for a logical network is derived by passing timing or clock pulse signals through a translation device, which may be a transformer, to various gating circuits. While this technique may be suitable for most situations, it may also be desired to actuate the gating circuits by the same timing signals or clock pulses in the manner indicated in Figure 6 where a typical binary adder network is shown. The particular mechanization of the network will not be considered here, reference being made to an article entitled "Transistor Shift Register and Serial Adder," by James R. Harris, found on page 1597 of the Proc. of the Institute of Radio Engineers, November 1952.

Referring now to Figure 6, it will be noted that the clock pulse signals are not only applied to the center tap of a plurality of transformers producing output signal pairs A, A'; B, B'; and C, C', respectively, but are also applied to a plurality of "and" circuits, each of which has a gating resistor. The same clock pulse signals bias the gating resistors of the "and" circuits.

This technique prevents the diodes of the gating circuits from conducting prior to the application of the clock pulse signals and thus obviates the sometimes time-consuming requirement of a diode recovering from a conducting state to a non-conducting state.

The other alternative, of course, is to apply a D.C. signal to the gating resistor, which requires less clock pulse power but results in D.C. current passing through the diode prior to the application of the clock pulse to the cathode thereof.

It will be understood, of course, that the invention may be practiced with either a D.C. level or a clock pulse being applied to the gating resistor, the clock pulse technique being preferred only for high speed operations.

From the foregoing description, it should now be apparent that the invention provides an improved technique for deriving control signals from a static bistable element without disturbing the state thereof while at the same time making it possible to drive a considerable number of logical gating circuits.

As pointed out above, this technique is especially important where transistor bistable elements are employed and the power capacity of the flip-flop is limited. Thus, in accordance with the basic principle of the invention, the required power is effectively derived directly through the clock pulse or synchronizing pulse source under the control of a series of low power flip-flops or other bistable elements.

One of the advantages provided by the invention is that more reliable operation of gating circuits may be achieved utilizing pulse type input signals as provided by the present invention. Thus, if a particular logical condition is to be represented at a particular input of the gating circuit by a positive pulse, the absence of that logical condition is evidenced not merely by the absence of the positive pulse, but by the application of a negative pulse to the gating input.

What I claim as new and desire to secure by Letters Patent of the United States is:

1. In combination, a transistor flip-flop which includes first and second cross-coupled transistors; third and fourth transistors each including collector, base, and emitter electrodes, each collector emitter path constituting a low impedance current conduction path, the current therethrough being controllable through the application of a bias signal to the base electrode of the respective transistor, said first transistor having an emitter electrode connected to the base electrode of said third transistor and said second transistor having an emitter electrode connected to the base electrode of said fourth transistor; a transformer including primary and secondary windings, the primary winding thereof having two ends each coupled to one end of the low impedance current path of a separate one of said third and fourth transistors; means for impressing synchronizing signals of a substantially constant frequency between a center tap in said primary winding and the other ends of said current conduction paths; and means for deriving output signals from said secondary winding representing the state of said flip-flop.

2. In combination, a multivibrator stage including first and second amplifiers each having its output circuit cross-coupled to the input circuit of the other amplifier to permit operation of said multivibrator in two different states; first and second switching stages each having an input terminal and first and second output terminals, said switching stages each including a low impedance current-conduction path between its output terminals and including a control circuit coupling said input terminal to the respective current-conduction path; means for conductively coupling the output circuits of said first and second amplifiers to the input terminals of said first and second switching stages respectively; a transformer having primary and secondary sections, said primary section having first and second ends coupled to the first output terminals of said switching stages, respectively; means for impressing interrogation pulses between an intermediate point on said primary section and said second output terminals, said interrogation pulses being impressed at a frequency corresponding to the maximum rate of change of state of said multivibrator; and means for deriving pulses from said secondary section representing the state of said multivibrator.

3. In combination, a multivibrator stage including first and second amplifiers each having its output circuit cross-coupled to the input circuit of the other amplifier to permit operation of said multivibrator in two different states; first and second switching stages each having an input terminal and first and second output terminals, said switching stages each including a low impedance current-conduction path between its output terminals and including a control circuit coupling said input terminal to the respective current-conduction path; means for conductively coupling the output circuits of said first and second amplifiers to the input terminals of said first and second switching stages respectively; a transformer having primary and secondary sections, said primary section having first and second ends coupled to the first output terminals of said switching stages, respectively; means for impressing interrogation pulses of a substantially constant frequency between an intermediate point on said primary section and said second output terminals; and means for deriving pulses from said secondary section representing the state of said multivibrator.

4. In combination, a multivibrator stage including first and second amplifiers each having its output circuit cross-coupled to the input circuit of the other amplifier to permit operation of said multivibrator in two different states; first and second switching stages each having an input terminal and first and second output terminals, said switching stages each including a low impedance current-conduction path between its output terminals and including a control circuit coupling said input terminal to the respective current-conduction path; means for conductively coupling the output circuits of said first and second amplifiers to the input terminals of said first and second switching stages respectively; a transformer having primary and secondary sections, said primary section having first and second ends coupled to the first output terminals of said switching stages, respectively; means for impressing unidirectional interrogation pulses between an intermediate point on said primary section and said second output terminals; and means for deriving pulses from said secondary section representing the state of said multivibrator.

5. In combination, a multivibrator stage including first and second amplifiers each having its output circuit cross-coupled to the input circuit of the other amplifier to permit operation of said multivibrator in two different states; first and second switching stages each having an input terminal and first and second output terminals, said switching stages each including a low impedance current-conduction path between its output terminals and including a control circuit coupling said input terminal to the respective current-conduction path; means for conductively coupling the output circuits of said first and second amplifiers to the input terminals of said first and second switching stages respectively; a transformer having primary and secondary sections, said primary section having first and second ends coupled to the first output terminals of said switching stages, respectively; means for impressing interrogation pulses between an intermediate point on said primary section and said second output terminals synchronously with input signals impressed upon said multivibrtor; and means for deriving pulses from said secondary section representing the state of said multivibrator.

6. In combination, a multivibrator stage including first and second amplifiers each having its output circuit cross-coupled to the input circuit of the other amplifier to permit operation of said multivibrator in two different states; first and second switching stages each having an input terminal and first and second output terminals, said switching stages each including a low impedance current-conduction path between its output terminals and including a control circuit coupling said input terminal to the respective current-conduction path; means for conductively coupling the output circuits of said first and second amplifiers to the input terminals of said first and second switching stages respectively; a transformer having primary and secondary sections, said primary section having first and second ends coupled to the first output terminals of said switching stages, respectively; means for impressing interrogation pulses between an intermediate point on said primary section and said second output terminals; and means for deriving pulses from said secondary section representing the state of said multivibrator, the ends of said secondary section being included in said last-named means, said last-named means including a tap on said secondary section intermediate its ends, said last-named means also including means for maintaining said tap at a fixed reference potential.

7. In combination, a multivibrator stage including first and second amplifiers each having its output circuit cross-coupled to the input circuit of the other amplifier to permit operation of said multivibrator in two different states; first and second switching stages each having an input terminal and first and second output terminals, said switching stages each including a low impedance current-conduction path between its output terminals and including a control circuit coupling said input terminal to the respective current-conduction path; means for conductively coupling the output circuits of said first and second amplifiers to the input terminals of said first and second switching stages respectively; a transformer having primary and secondary sections, said primary section having first and second ends coupled to the first output terminals of said switching stages, respectively; means for impressing unidirectional interrogation pulses of a substantially constant frequency between an intermediate point on said primary section and said output terminals, said pulses being impressed synchronously with input signals to said multivibrator; and means for deriving pulses from said secondary section representing the state of said multivibrator, said last-named means including the ends of said secondary section to produce bilevel signals representing the state of said multivibrator and a tap intermediate said ends, said last-named means also including means to maintain said tap on said secondary section at a fixed reference potential.

References Cited in the file of this patent

UNITED STATES PATENTS

| | | |
|---|---|---|
| 1,657,587 | Pupin | Jan. 31, 1928 |
| 2,173,164 | Hansell | Sept. 19, 1939 |
| 2,652,560 | Hawkins | Sept. 15, 1953 |
| 2,711,499 | Lippel | June 21, 1955 |